Figure 1:
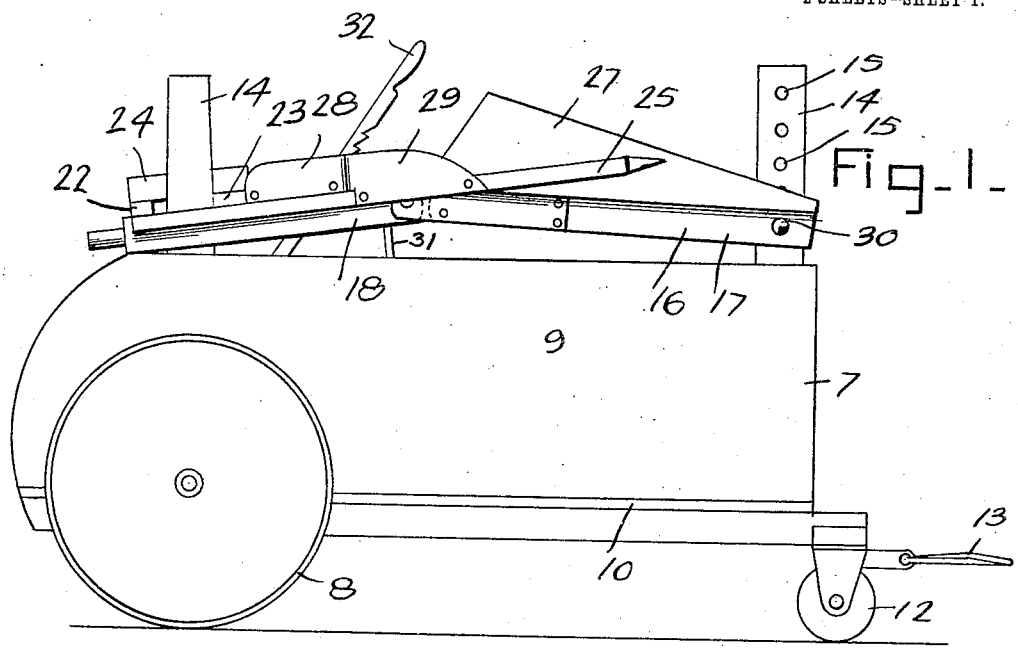

No. 876,615.

PATENTED JAN. 14, 1908.

S. E. WOODS.
CORN TOPPER.
APPLICATION FILED JUNE 8, 1907.

2 SHEETS—SHEET 1.

Witnesses
W. S. Rockwell
H. C. McQuinney

Inventor
Samuel E. Woods,
By
Chandler & Chandler
Attorneys

THE NORRIS PETERS CO., WASHINGTON, D. C.

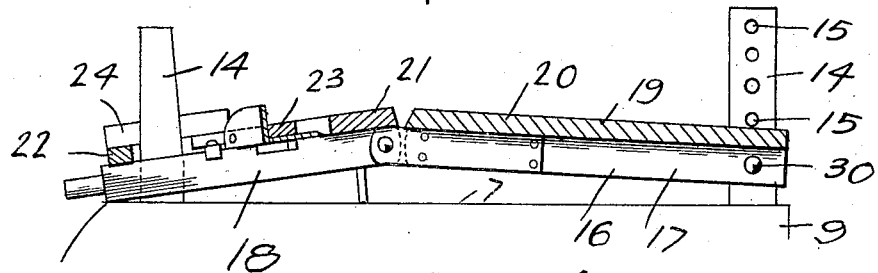
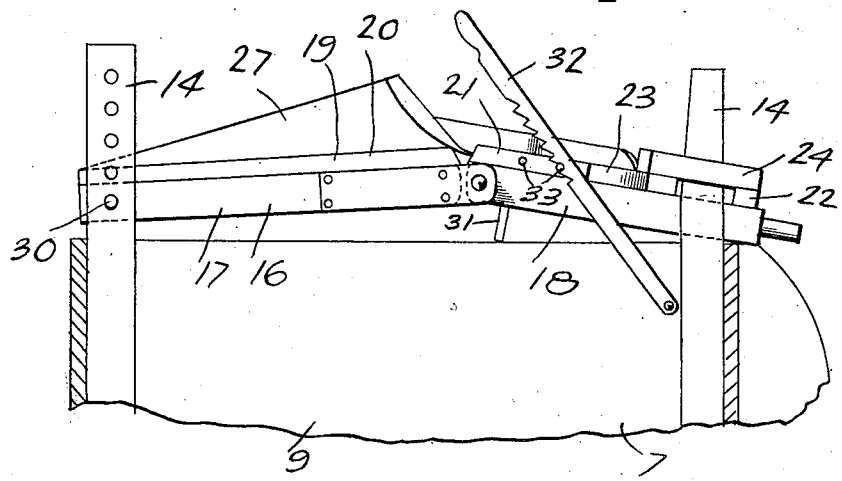
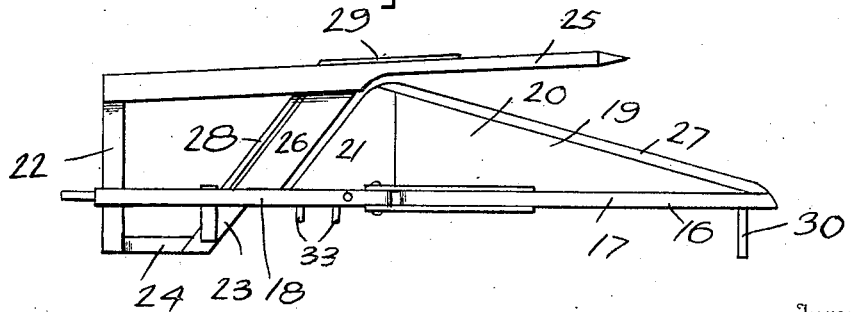

UNITED STATES PATENT OFFICE.

SAMUEL E. WOODS, OF LOCKWOOD, OKLAHOMA.

CORN-TOPPER.

No. 876,615.  Specification of Letters Patent.  Patented Jan. 14, 1908.

Application filed June 8, 1907. Serial No. 377,954.

*To all whom it may concern:*

Be it known that I, SAMUEL E. WOODS, a citizen of the United States, residing at Lockwood, in the county of Beaver, Oklahoma, have invented certain new and useful Improvements in Corn-Toppers; and I do hereby declare the following to be a full, clear, and exact description of the invention, such as will enable others skilled in the art to which it appertains to make and use the same.

The present invention has reference to improvements in corn toppers, and it aims to provide an extremely simple, durable, and effective device of that nature for harvesting the heads of such grains as Kafir-corn, broom-corn, and sorghum, or the like, the device being capable of ready attachment to the body of a wagon.

To this end, the device comprises a jointed triangular guide-plate, a knife disposed slightly in the rear of the guide-plate, and a guide-arm disposed adjacent the forward edge of the guide-plate, the two guides coöperating to direct the tops of the grain to the knife, both the knife and the guide-arm being secured to the rear member of the jointed frame of the attachment, which frame may be "broken" to adjust the position of the knife.

The invention will be readily understood from a consideration of the following detailed description, and its preferred embodiment is illustrated in the accompanying drawings, in which like parts are designated by corresponding reference numerals in the several views.

Figure 2:
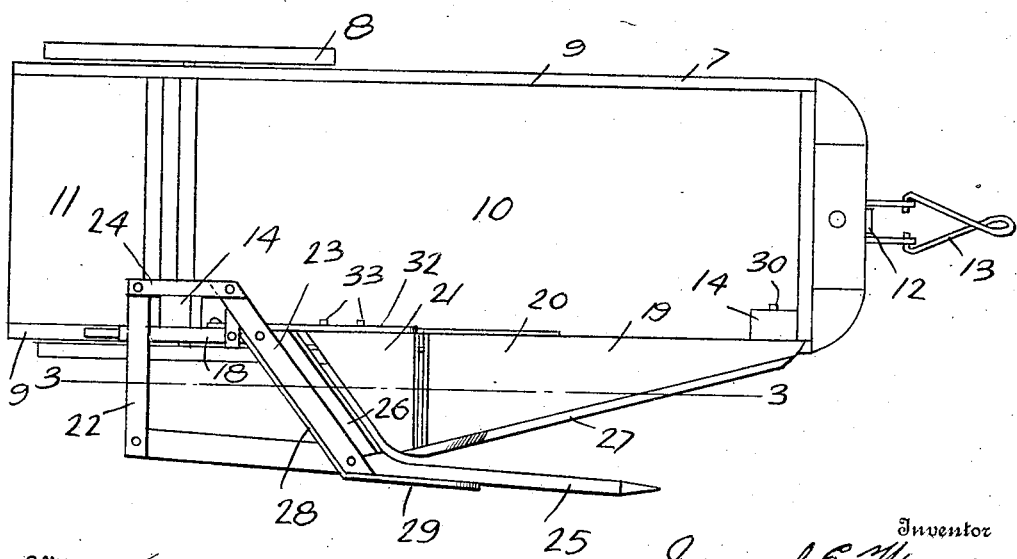

Of the said drawings—Figure 1 is a side elevation of a wagon having the improved topper attached thereto. Fig. 2 is a top plan view. Fig. 3 is a section taken on the line 3—3 of Fig. 2. Fig. 4 is a side elevation of the attachment taken from the interior of the wagon. Fig. 5 is a bottom plan view of the attachment.

Referring more particularly to the drawings, the reference numeral 7 indicates generally a wagon body provided with a pair of rear wheels 8, the side-boards 9 of the wagon-body and the floor 10 thereof extending rearwardly beyond the wheels, as shown in Fig. 2, to provide a platform 11 for the operator. The floor is likewise extended slightly beyond the front end of the wagon body, and to this extension is attached a pivoted bracket carrying a guide wheel 12, to which bracket a clevis 13 is fastened.

The height of one of the side boards and of the rear end board of the wagon body is slightly less than that of the opposite side board and of the front end board, as shown in Fig. 1, there being a pair of uprights 14 mounted within the wagon body adjacent the opposite corners of the lower side board, the forward upright having a vertically-arranged series of perforations 15 formed therethrough.

Carried by the uprights is a corn-topping attachment which is disposed longitudinally of the wagon body and consists of a supporting bar 16, comprising a front member 17 and a rear member 18, the mutually adjacent inner ends of said members being hinged together, such connection forming a break-joint. Mounted upon the supporting bar is an approximately triangular shaped guide plate 19, which is likewise formed in two parts, the front member 20 being connected to the front member of the bar, and the rear member 21 to the rear member of the bar. The mutually adjacent inner ends of the members of the guide-plate are disposed parallel with each other and at right-angles to the supporting bar, each of said members therefore being in the form of a right-angled triangle.

The member 18 of the bar projects at its rear end directly over the platform 11, and is connected adjacent such end to a rear brace 22, disposed in advance of which is a brace 23, which is likewise fastened to said member intermediate its ends and projects outwardly and forwardly of the wagon body, the inner ends of the braces 22 and 23 being connected by a longitudinal brace 24. The space between said braces and the adjacent member of the supporting bar therefore forms a guide-opening through which the rear upright extends.

Secured to the outer ends of the braces 22 and 23 is a guide-arm 25, which is likewise inclined outwardly and forwardly of the wagon body and is reduced at its forward ends, as shown, the reduced portion terminating in an inwardly-directed curve, adjacent which point a cutting blade 26 is secured at its outer end to said arm, the inner end of the blade being secured to the bar member 17. This blade, which fits against the under face of the forward brace 23 and is secured thereto, has its cutting edge disposed parallel with and in spaced relation to the rear edge of the member 21 of the guide plate, the apex of said member being slightly curved, as shown, to correspond with the curved terminus of the reduced portion of the guide-arm, so that when the wagon is in motion the tops of the corn will be obviously directed by the guide-arm against the cutting edge of the blade.

The outer edge of the member 20 of the guide plate carries an upstanding triangular shoulder 27, whose beveled rear edge extends across the outer end of the member 21, the opposite ends of said shoulder being rounded, as shown. The brace 23 is likewise provided with an upstanding shoulder 28 secured to its rear face, said shoulder having a forward extension 29 which is secured to the outer face of the guide-arm 26.

In attaching the topping device to the wagon body, a laterally projecting pin 30 carried by the member 17 of the bar is inserted in one of the perforations in the forward upright, and the rear upright passed through the chamber formed by the braces 22, 23, and 24, and by the rear end of the member 18 of the supporting bar. In such position the supporting bar is disposed directly above the upper edge of the adjacent side board of the wagon body in order to permit a depending stop 31 carried by the member 18 to contact thereagainst to slightly incline the members of the supporting bar with respect to each other, the joint between said members being thus partly broken. When, however, it is desired to dispose the members of the bar and guide plate at a greater angle to each other, the handle end of the rear member of the bar is depressed by the operator, thus breaking the joint to a greater extent and, in consequence, changing the angle at which the knife is disposed. The parts are retained in adjusted position by means of a toothed lever 32, which is pivoted to the wagon body adjacent the rear upright and is adapted for engagement with one or the other of a pair of laterally-projecting teeth 33, with which the rear member of the guide plate is provided. It will be understood that the forward member of the supporting bar may be further adjusted owing to the interchangeable engagement of its pin 30 in the perforations formed through the forward upright.

From the foregoing it will be apparent that when the wagon is driven through the field the corn will be directed by the combined action of the front member of the guide plate and the guide arm into the channel leading to the cutting blade, the edge of which severs the tops of the corn, which fall onto the upper face of the guide plate, from thence into the wagon body.

What is claimed, is—

1. The combination, of a wagon body having a pair of uprights mounted therein adjacent the opposite ends of one of its side boards; a corn-topping device carried by said uprights and consisting of a jointed guide-plate comprising a front member and a rear member, a blade disposed parallel with and in spaced relation to the rear edge of the last-mentioned member, and a guide-arm adapted to direct the corn to said blade; and means adapted for engagement with said rear member when the joint between the latter and said front member is broken to retain said members in adjusted position with respect to each other.

2. The combination of a wagon body having a pair of uprights mounted therein adjacent the opposite ends of one of its side boards; a corn-topping device carried by said uprights and including a jointed triangular guide-plate comprising a front member and a rear member, a blade disposed parallel with and in spaced relation to the rear edge of the last-mentioned member, and a guide arm inclined outwardly and forwardly of the wagon body and adapted to direct the corn to said blade; and means adapted for engagement with said rear member, when the joint between the latter and said front member is broken to retain said members in adjusted position with respect to each other.

3. The combination of a wagon body having a pair of uprights mounted therein adjacent the opposite ends of one of its side boards; a corn-topping device carried by said uprights and including a jointed supporting bar disposed longitudinally of the wagon body, a two-part guide-plate having each member thereof secured to the adjacent member of said bar, a guide arm inclined outwardly and forwardly of the wagon body and connected to the rear member of said bar, and a blade connected at opposite ends to the latter member and to said guide-arm, said guide-arm being adapted to direct the corn to said blade; and means adapted for engagement with the rear member of said guide-plate when the joint between the members of said bar is broken to retain said members in adjusted position with respect to each other.

4. The combination of a wagon body having a pair of uprights mounted therein adjacent the opposite ends of one of its side boards; a corn-topping device carried by said uprights and including a jointed supporting bar, a guide-plate carried by said bar and comprising a triangular front member fastened to the front member of said bar and a triangular rear member fastened to the rear member thereof, said triangular members having their mutually adjacent inner edges disposed parallel with each other and at right-angles to said bar, a guide-arm inclined outwardly and forwardly of the wagon body and connected to the rear member of said bar, and a blade connected at opposite ends to said last-mentioned member and said guide-arm and disposed in spaced relation to the rear edge of the rear member of said guide-plate, said guide-arm being adapted to direct the corn to said blade; and means adapted for engagement with the rear member of said guide-plate when the joint between the members of said bar is broken to retain said members in adjusted position with respect to each other.

5. The combination of a wagon body having a pair of uprights mounted therein adjacent the opposite ends of one of its side boards, the forward upright having a vertically arranged series of perforations formed therethrough; a corn-topping device carried by said uprights and including a supporting bar comprising a front member and a rear member hinged together, said front member having a laterally-projecting pin for engagement in one of the perforations in said forward upright, a guide-plate carried by said bar and comprising a triangular front member fastened to the front member of said bar and a triangular rear member fastened to the rear member thereof, said triangular members having their mutually-adjacent inner edges disposed parallel with each other and at right-angles to said bar, a guide-arm inclined outwardly and forwardly of the wagon body and connected to the rear member of said bar, and a blade connected at opposite ends to said last-mentioned member and said guide-arm and disposed in spaced relation to the rear edge of the rear member of said guide-plate, said guide-arm being adapted to direct the corn to said blade; means adapted for engagement with the rear member of said plate, when the joint between the members of said bar is broken to retain said members in adjusted position with respect to each other; and a stop carried by one of said members for engagement with the upper edge of the adjacent side board of the wagon body.

In testimony whereof, I affix my signature, in presence of two witnesses.

SAMUEL E. WOODS.

Witnesses:
  C. CURTIS,
  J. CURTIS.